United States Patent
Kim et al.

(10) Patent No.: US 11,339,086 B2
(45) Date of Patent: May 24, 2022

(54) COATING COMPOSITION AND COOKING APPLIANCE

(71) Applicant: LG ELECTRONICS INC., Seoul (KR)

(72) Inventors: Taehee Kim, Seoul (KR); Taeho Kim, Seoul (KR); Dongwan Seo, Seoul (KR); Yongsoo Lee, Seoul (KR); Suyeon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 16/288,945

(22) Filed: Feb. 28, 2019

(65) Prior Publication Data

US 2019/0263716 A1    Aug. 29, 2019

(30) Foreign Application Priority Data

Feb. 28, 2018    (KR) .................. 10-2018-0024359

(51) Int. Cl.

| | |
|---|---|
| *B32B 15/04* | (2006.01) |
| *B32B 17/06* | (2006.01) |
| *C03C 17/23* | (2006.01) |
| *A47J 27/00* | (2006.01) |
| *C03C 3/085* | (2006.01) |
| *C03C 3/19* | (2006.01) |
| *F24C 15/00* | (2006.01) |

(Continued)

(52) U.S. Cl.
CPC ............ *C03C 17/23* (2013.01); *A47J 27/002* (2013.01); *C03C 3/085* (2013.01); *C03C 3/19* (2013.01); *C03C 8/14* (2013.01); *C03C 17/02* (2013.01); *F24C 15/005* (2013.01); *C03C 2217/214* (2013.01); *C03C 2217/216* (2013.01); *C03C 2217/228* (2013.01); *C03C 2217/23* (2013.01); *C03C 2217/70* (2013.01); *C03C 2217/78* (2013.01); *C03C 2217/90* (2013.01); *C03C 2218/119* (2013.01); *C03C 2218/30* (2013.01)

(58) Field of Classification Search
CPC ............................. A47J 27/002; C03C 17/23
USPC ................................. 428/428, 426, 701, 702
See application file for complete search history.

(56) References Cited

U.S. PATENT DOCUMENTS

| | | | |
|---|---|---|---|
| 5,993,974 A | 11/1999 | Fukushima et al. | |
| 10,427,973 B2 * | 10/2019 | Gorecki | .................... C03C 8/14 |

(Continued)

FOREIGN PATENT DOCUMENTS

| | | | |
|---|---|---|---|
| EP | 1167310 | * | 1/2002 |
| JP | H0383836 | | 4/1991 |

(Continued)

OTHER PUBLICATIONS

Extended European Search in European Application No. 18198922.9, dated Jul. 19, 2019, 8 pages.

*Primary Examiner* — Lauren R Colgan
(74) *Attorney, Agent, or Firm* — Fish & Richardson P.C.

(57) ABSTRACT

A coating composition includes phosphorus pentoxide ($P_2O_5$), aluminum oxide ($Al_2O_3$), boron trioxide ($B_2O_3$), zinc oxide (ZnO), I group-based metal oxide, and II group-based metal oxide. The coating composition includes by weight based on a total weight of the coating composition 35 to 55% $P_2O_5$, 5 to 35% $Al_2O_3$, 5 to 40% I group-based metal oxide, 5 to 10% $B_2O_3$, 1 to 5% ZnO, and 1 to 10% II group-based metal oxide.

7 Claims, 5 Drawing Sheets

(51) Int. Cl.
*C03C 17/02* (2006.01)
*C03C 8/14* (2006.01)

(56) References Cited

U.S. PATENT DOCUMENTS

| | | | | |
|---|---|---|---|---|
| 2005/0014625 | A1* | 1/2005 | Espargilliere | C03C 3/21 501/48 |
| 2009/0311514 | A1* | 12/2009 | Shon | F24C 15/005 428/325 |
| 2011/0011423 | A1* | 1/2011 | Baek | F24C 15/005 134/18 |
| 2011/0049122 | A1* | 3/2011 | Baek | F24C 15/005 219/385 |
| 2011/0262758 | A1* | 10/2011 | Benford, Jr | C03C 8/00 428/433 |
| 2013/0299483 | A1* | 11/2013 | Kim | C03C 8/08 219/391 |
| 2013/0299484 | A1* | 11/2013 | Lee | C03C 8/08 219/391 |
| 2018/0215655 | A1* | 8/2018 | Kim | C03C 8/08 |
| 2019/0169065 | A1* | 6/2019 | Choi | F27D 1/0003 |

FOREIGN PATENT DOCUMENTS

| | | |
|---|---|---|
| JP | H11139847 | 5/1999 |
| KR | 1020090130668 | 12/2009 |
| KR | 101347039 | 1/2014 |
| KR | 1020140115562 | 10/2014 |

* cited by examiner

FIG. 9

| No. | Items | Recipe Picture | Recipe Weight | Brand + Name | Remark |
|---|---|---|---|---|---|
| 1 | Cherry Pie Filling | | 1/2 cup | Comstock Cherry Pie Filling | 1 cup = 236.6 ml ½ cup = 118.3 ml |
| 2 | Tomato Puree | | 1/2 cup | Progresso Tomato Puree | 1 cup = 236.6 ml ½ cup = 118.3 ml |
| 3 | Egg Yolk | NA | 1/2 cup | Egg Yolk (Large Egg Yolk) | 1 cup = 236.6 ml ½ cup = 118.3 ml |
| 4 | Mozzarella Cheese | | 4 ounce | Polly-O Whole Milk Mozzarella | 4 oz. = 113.4 g |
| 5 | Cream Cheese | | 4 ounce | Kraft Velveeta Pasteurized Prepared Cheese Product | 4 oz. = 113.4 g |
| 6 | Starch | | 2 teaspoons | Minute Tapioca | 2 t/s = 9.9 ml |
| 7 | Shortening | | 4 ounce | Armour Lard (in 1 inch chunks) | 4 oz. = 113.4 g |
| Mixing Condition | | Run 2 minutes on high speed | | | - |

FIG. 10

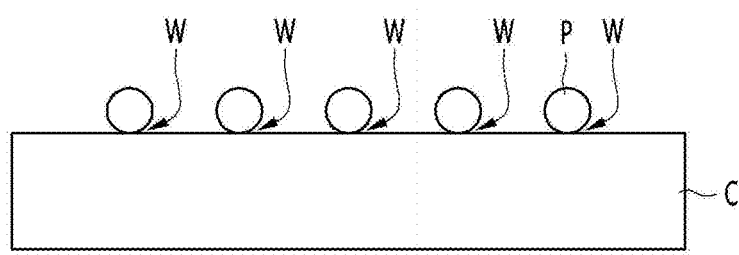

COATING COMPOSITION AND COOKING APPLIANCE

CROSS-REFERENCE TO RELATED APPLICATIONS

The present application claims priority under 35 U.S.C. 119 and 35 U.S.C. 365 to Korean Patent Application No. 10-2018-0024359, filed on Feb. 28, 2018, which is hereby incorporated by reference in its entirety.

FIELD

The present disclosure relates to coating composition of materials and a cooking appliance including the same.

BACKGROUND

A cooking appliance can provide heat to cook food using a heating source. The cooking appliance may include a door that can open and close at least a portion of the cooking appliance. The cooking appliance may include a cooking chamber configured to receive and heat food in which the food may be cooked by heat provided from the heating source.

In some cases, food waste or the like may be generated in the process of cooking food, and be deposited on an inner wall of the cavity of the cooking appliance or the inner wall of the door. When cooking is completed, it may be necessary to clean the inner surface of the cavity and the door.

In some examples, the door of the cooking appliance may be made of glass. Contaminants may be deposited on the door made of glass, and be cleaned in various ways.

For example, food or chemical residue deposited on the door may be cleaned by chemical such as chemical detergent. In some cases, the glass could be damaged by the chemical detergent, and the chemical detergent may remain in the cooking appliance and contaminate food.

In some examples, food waste may be mechanically removed, for example, by scraping the surface of the door using a scraping tool. In some cases, scratches may be generated in the surface of the door during the scratching, and thus the door may be damaged.

In some examples, the door may be cleaned by high-temperature steam, which may increase cleaning cost and time.

There is interest in a cooking appliance that includes a door having a configuration for effectively removing contaminants from the surface of the door without a damage or deformation of the door of the cooking appliance.

SUMMARY

The present disclosure provides coating composition that enables easily cleaning of the door of the cooking appliance with improved cleaning performance, and a cooking appliance including the composition.

According to one aspect of the subject matter described in this application, a coating composition includes phosphorus pentoxide ($P_2O_5$), aluminum oxide ($Al_2O_3$), boron trioxide ($B_2O_3$), zinc oxide (ZnO), I group-based metal oxide, and II group-based metal oxide. The coating composition comprises, by weight based on a total weight of the coating composition, 35 to 55% $P_2O_5$, 5 to 35% $Al_2O_3$, 5 to 40% I group-based metal oxide, 5 to 10% $B_2O_3$, 1 to 5% ZnO, and 1 to 10% II group-based metal oxide.

Implementations according to the aspect may include one or more of the following features. For example, the I group-based metal oxide may include at least one metal oxide selected from sodium oxide ($Na_2O$) or potassium oxide ($K_2O$). The II group-based metal oxide may include at least one metal oxide selected from barium oxide (BaO), calcium oxide (CaO), or magnesium oxide (MgO). In some examples, a firing temperature of the coating composition is less than or equal to 700 degrees Celsius.

In some implementations, the coating composition includes 40 to 50% $P_2O_5$ by weight. In some implementations, the coating composition includes 15 to 25% $Al_2O_3$ by weight. In some implementations, the coating composition includes 10 to 30% I group-based metal oxide by weight. In some implementations, the coating composition includes 3 to 7% II group-based metal oxide by weight.

According to another aspect, a method for producing reinforced glass includes providing a base including glass, applying coating composition on the base, heating the base and the coating composition, and quenching the base and the coating composition. In this method, heating the base and the coating composition includes heating the base and the coating composition to a temperature less than or equal to 700 degrees Celsius. The coating composition comprises phosphorus pentoxide ($P_2O_5$), aluminum oxide ($Al_2O_3$), boron trioxide ($B_2O_3$), zinc oxide (ZnO), I group-based metal oxide, and II group-based metal oxide. The coating composition includes by weight based on a total weight of the coating composition, 35 to 55% $P_2O_5$, 5 to 35% $Al_2O_3$, 5 to 40% I group-based metal oxide, 5 to 10% $B_2O_3$, 1 to 5% ZnO, and 1 to 10% II group-based metal oxide.

Implementations according to this aspect may include one or more of the following features. For example, the I group-based metal oxide includes at least one metal oxide selected from sodium oxide ($Na_2O$) or potassium oxide ($K_2O$). The II group-based metal oxide includes at least one metal oxide selected from barium oxide (BaO), calcium oxide (CaO), or magnesium oxide (MgO). In some examples, the base includes soda lime glass. In some examples, a visible-light transmittance of the reinforced glass is greater than or equal to 60% and less than or equal to 80%.

In some implementations, a firing temperature of the coating composition is less than or equal to 700 degrees Celsius, an increase of the I group-based metal oxide within a range of 5 to 40% results in a decrease of the firing temperature of the coating composition. In some examples, an increase of at least one of $Al_2O_3$, $B_2O_3$, or the II group-based metal oxide in the coating composition within in the specified ranges above results in an increase of chemical resistance of the coating composition.

In some examples, heating the base and the coating composition includes heating the base and the coating composition at the temperature less than or equal to 700 degrees Celsius for a time interval less than or equal to 5 minutes. In some examples, quenching the base and the coating composition includes quenching the base and the coating composition to a room temperature.

According to another aspect, a cooking device includes a cooking chamber defined by a cavity of the cooking device, a door configured to open and close at least a portion of the cooking chamber, and at least one heating source configured to provide heat to an object in the cooking chamber. The door includes a base including glass and a coating layer disposed on the base, where the coating layer includes a coating composition configured to be applied to glass. The coating composition includes phosphorus pentoxide ($P_2O_5$), aluminum oxide ($Al_2O_3$), boron trioxide ($B_2O_3$), zinc oxide (ZnO), I group-based metal oxide, and II group-based metal oxide. The coating composition includes, by weight based on a total weight of the coating composition, 35 to 55% $P_2O_5$, 5 to 35% $Al_2O_3$, 5 to 40% I group-based metal oxide, 5 to 10% $B_2O_3$, 1 to 5% ZnO, and 1 to 10% II group-based metal oxide.

Implementations according to this aspect may include one or more of the following features. For example, the I group-based metal oxide may include at least one metal oxide selected from sodium oxide ($Na_2O$) or potassium oxide ($K_2O$). The II group-based metal oxide may include at least one metal oxide selected from barium oxide (BaO), calcium oxide (CaO), or magnesium oxide (MgO).

In some examples, a visible-light transmittance of glass of the base coated by the coating composition is greater than or equal to 60% and less than or equal to 80%. In some examples, a firing temperature of the coating composition is less than or equal to 700 degrees Celsius. In some implementations, the base includes soda lime glass.

Further details of one or more present examples are described with the accompanying drawings and the description below. Other features will be apparent from the description, drawings, and claims.

BRIEF DESCRIPTION OF DRAWINGS

FIG. 9 is a table showing example food that may produce contaminants and that are used for measuring an example cleaning performance of the coated layer.

FIG. 10 shows an example of a removal process of contaminant from the coated layer.

DETAILED DESCRIPTION

Figure 1:
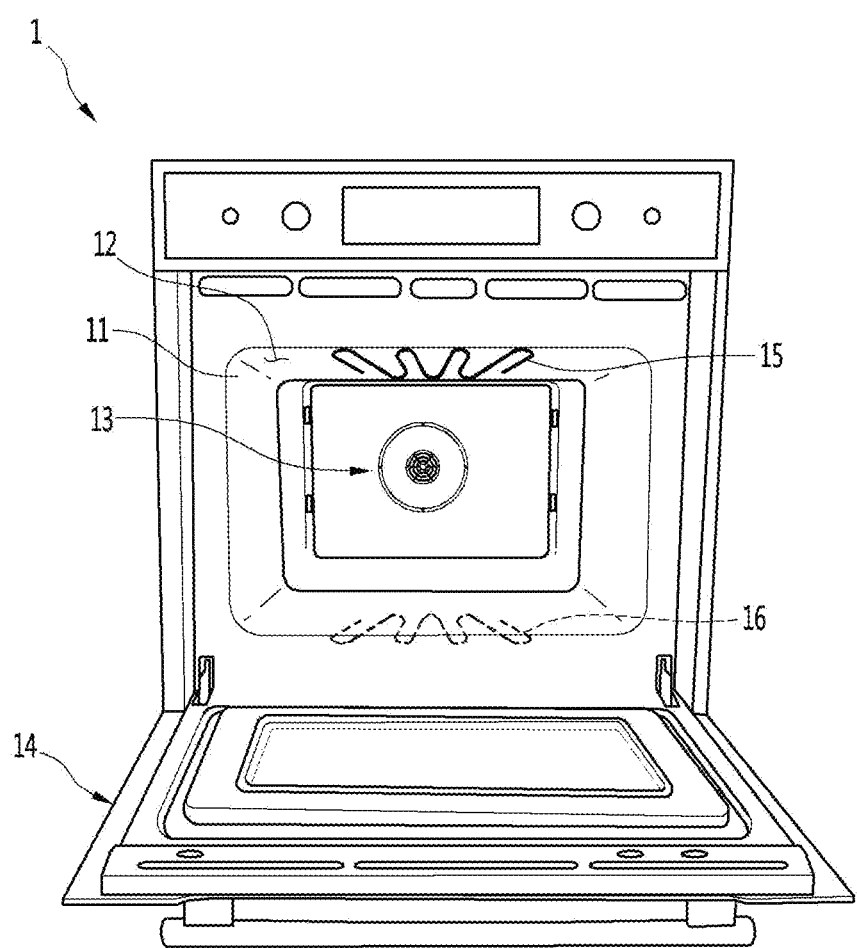
FIG. 1 is a front view of an example cooking appliance.

The above objects, features and advantages will become apparent from the detailed description with reference to the accompanying drawings. Implementations are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, implementations of the present disclosure will be described in detail with reference to the accompanying drawings. Throughout the drawings, like reference numerals refer to like elements.

Hereinafter, examples of a coating composition and a cooking appliance including the same will be described with reference to the drawings.

FIG. 1 is a front view of an example cooking appliance.

Referring to FIG. 1, a cooking appliance 1 includes a cavity 11 that defines a cooking chamber 12, a door 14 configured to selectively open and close at least a portion of the cooking chamber 12, and at least one heating source configured to supply heat to an object or a to-be-cooked material in the chamber 12.

For example, the cavity 11 may be formed in a hexahedron space whose front face is opened. The heating source may include a convection assembly 13 for discharging heated air into the cavity 11, an upper heater 15 disposed above the cavity 11, and a lower heater 16 disposed below the cavity 11. The heating source does not necessarily include all of the convection assembly 13, the upper heater 15, and the lower heater 16. That is, the heating source may include at least one of the convection assembly 13, the upper heater 15, or the lower heater 16.

The upper heater 15 and the lower heater 16 may be provided inside or outside the cavity 11.

Figure 2:
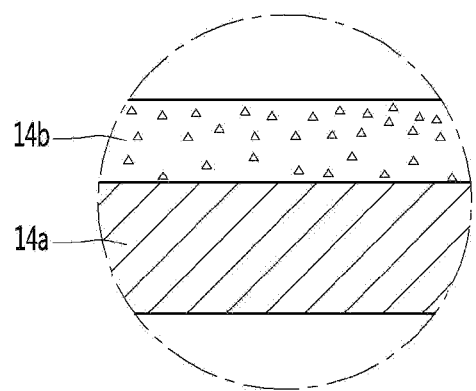
FIG. 2 and FIG. 3 are cross-sectional enlarged views of a portion of a rear face of an example door of the cooking appliance of FIG. 1.
Figure 3:
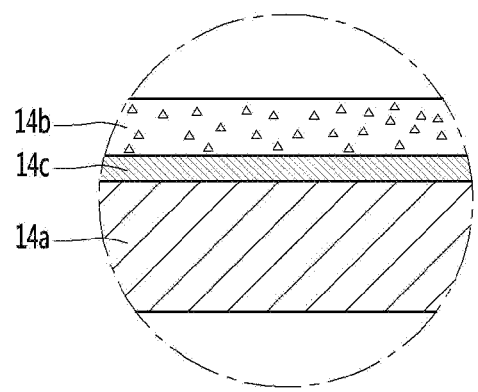

FIG. 2 and FIG. 3 illustrate examples of a coated layer formed on the rear face of the door 14.

The coated layer may include a coating composition as described below. The coated layer may be coated on the rear face of the door 14.

The coated layer may serve to improve a cleaning performance of the rear face of the door 14.

Referring to FIG. 2 and FIG. 3, the coated layer may be formed on the rear face of the door 14. In detail, the coated layer may be formed on the rear face of the door 14 facing the cooking chamber 12 in a state where the cooking chamber 12 is shielded at the front thereof. The coated layer may serve to improve the cleaning performance of the rear face of the door 14.

The door 14 may include a base 14a and a coated layer 14b on the base 14a.

For example, the base 14a may include glass.

Referring to FIG. 2, the coated layer 14b may be formed in direct contact with the base 14a.

Alternatively, referring to FIG. 3, the coated layer 14b may be formed in indirect contact with the base 14a. In detail, a buffer layer 14c may be formed between the base 14a and the coated layer 14b. The buffer layer 14c may include an adhesive layer. That is, the adhesive strength between the base 14a and the coated layer 14b may be improved by the buffer layer 14c.

The coated layer may be coated on the rear face of the door 14 by coating a coating composition thereon. In detail, the coating composition may be coated on the rear face of the door 14 to improve the cleaning performance of the rear face of the door 14.

Hereinafter, the coating composition coated on the door of the cooking appliance will be described.

The coating composition may include $P_2O_5$, $Al_2O_3$, $B_2O_3$, ZnO, I group-based metal oxide, or II group-based metal oxide.

In some implementations, the coating composition includes $P_2O_5$ in an amount of about 55 wt % or less based on the total weight of the coating composition. For example, $P_2O_5$ may be included in an amount of about 35 wt % to about 55 wt % with respect to the total weight of the coating composition. In some examples, $P_2O_5$ may be included in an amount of about 40% to about 50% by weight based on the total weight of the coating composition.

$P_2O_5$ in the coating composition may improve the cleaning performance of the coating composition. In some examples where the $P_2O_5$ content is less than about 35% by weight based on the total weight of the coating composition, the cleaning performance of the coating composition may be degraded and the hydrophilicity of the coating composition may be reduced. In other examples where the $P_2O_5$ content is greater than about 55 wt % based on the total weight of the coating composition, light transmission of the coating composition may be degraded.

In some implementations, the coating composition includes $Al_2O_3$ in an amount of about 35 wt % or less based on the total weight of the coating composition. For example, $Al_2O_3$ may be included in an amount of about 5 wt % to about 35 wt % with respect to the total weight of the coating composition. In some examples, $Al_2O_3$ may be contained in an amount of about 15% to about 25% by weight based on the total weight of the coating composition.

$Al_2O_3$ in the coating composition may improve the chemical resistance and durability of the coating composition. For instance, $Al_2O_3$ may be provided for a structural stabilization to complement a low chemical durability of the alkali phosphate glass structure formed by $P_2O_5$, $Na_2O$, and $K_2O$.

In some examples where the $Al_2O_3$ content is less than about 5% by weight based on the total weight of the coating composition, the chemical composition and durability of the coating composition may be degraded. Conversely, if the $Al_2O_3$ content is greater than about 35% by weight based on the total weight of the coating composition, a light transmittance of the coating composition may be lowered, and the firing temperature of the coating composition may be increased. In some examples, when $Al_2O_3$ is contained in an amount of larger than about 35% by weight based on the total weight of the coating composition, the crystalline range of the coating composition is increased and thus the emulsification of the coating composition is increased to allow the overall light transmittance of the coating composition to deteriorate.

In some implementations, the coating composition includes $B_2O_3$ in an amount of about 10% by weight or less based on the total weight of the coating composition. For example, $B_2O_3$ may be included from about 5% to about 10% by weight based on the total weight of the coating composition. In some examples, the $B_2O_3$ may be contained from about 6% to about 9% by weight based on the total weight of the coating composition.

$B_2O_3$ may extend a vitrification region of the coating composition and improve chemical resistance and durability of the coating composition. If the $B_2O_3$ content is less than about 5% by weight based on the total weight of the coating composition, the glass structure may be deteriorated due to a decrease in the vitrification region, which may result in a decrease in the durability of the coated layer. Conversely, if $B_2O_3$ content is greater than about 10% by weight based on the total weight of the coating composition, the firing temperature of the coating composition may be increased.

The I group-based metal oxide may include at least one metal oxide selected from $Na_2O$ and $K_2O$. For example, the I group-based metal oxide may include $Na_2O$ or $K_2O$. Alternatively, the coating composition may include both of $Na_2O$ and $K_2O$.

In some implementations, the coating composition includes the I group-based metal oxide in an amount of about 40% by weight or less based on the total weight of the coating composition. For example, the I group-based metal oxide may be contained about 5% to about 40% by weight based on the total weight of the coating composition. In some examples, the I group-based oxide may be contained from about 10% to about 30% by weight based on the total weight of the coating composition.

The I group-based metal oxide in the coating composition may reduce the firing temperature of the coating composition. For example, the I group-based metal oxide may sufficiently reduce thermal properties of the coating composition, thereby realizing low-temperature firing of the glass composition. In addition, the I group-based metal oxide may be contained in the coating composition to improve the hydrophilicity of the coating composition, thereby improving the cleaning performance of the coating composition.

When the I group-based metal oxide is contained in an amount of smaller than about 5 wt % based on the total weight of the coating composition, the cleaning performance of the glass composition may be deteriorated. In contrast, when the I group-based metal oxide is contained in an amount of greater than about 40% by weight based on the total weight of the coating composition, the firing temperature of the coating composition may not be lowered.

The II group-based metal oxide may include at least one metal oxide selected from the group consisting of BaO, CaO, and MgO. In detail, the II group-based metal oxide may contain BaO, CaO or MgO. Alternatively, the coating composition may contain all of BaO, CaO and MgO.

In some examples, the II group-based metal oxide may be contained in an amount of about 10% by weight or smaller based on the total weight of the coating composition. In detail, the II group-based metal oxide may be contained in an amount of about 1% by weight to about 10% by weight based on the total weight of the coating composition. More specifically, the II group-based metal oxide may be contained in an amount of about 3 wt % to about 7 wt % based on the total weight of the glass frit.

The II group-based metal oxide may be contained in the coating composition to improve the chemical resistance and durability of the coating composition. In addition, the II group-based metal oxide may be included in the coating composition to improve the light transmittance by improving hot-temperature wettability when the coating composition is fired. That is, the II group-based metal oxide improves the contact angle between the coating composition and the base, so that when the coating composition is fired, the coated layer may be formed in a flat manner on the base. Accordingly, light reflection due to scattering can be minimized to improve the light transmittance of the coated layer.

If the II group-based metal oxide is contained in an amount of smaller than about 1% by weight based on the total weight of the coating composition, the chemical resistance and durability of the glass composition may be deteriorated. Conversely, if the II group-based metal oxide is present in an amount greater than about 10% by weight based on the total weight of the glass frit, the firing temperature of the coating composition may be increased.

In some examples, the coating composition includes ZnO in an amount of about 5% by weight or smaller based on the total weight of the coating composition. In detail, ZnO may be included in an amount of about 1 wt % to about 5 wt % based on the total weight of the coating composition. More specifically, ZnO may be present in an amount of about 2% to about 4% by weight based on the total weight of the coating composition.

ZnO in the coating composition may increase the light transmittance of the coating composition. In some examples, ZnO may be contained in the coating composition to enhance the glass structure of the coating composition.

In some examples where the content of ZnO is less than about 1% by weight based on the total weight of the coating composition, the glass structure of the glass composition may be deteriorated to lower the durability of the coated layer. In other examples where ZnO is included in an amount greater than about 5 wt % based on the total weight of the glass frit, the light transmittance of the coating composition may be lowered.

In some implementations, the coating composition may be applied to reinforced glass.

For example, the coating composition may be applied to reinforced glass used for doors of cookware and the like.

In some examples, the coating composition may be applied to glass that can be used as the base of the door. The coating composition may be subjected to a firing and drying process to form the coated layer.

In some examples, the coated layer may include $P_2O_5$, $Al_2O_3$, $B_2O_3$, ZnO, I group-based metal oxide, or II group-based metal oxide such that the composition ratio of $P_2O_5$, $Al_2O_3$, $B_2O_3$, ZnO, I group-based metal oxide, and II group-based metal oxide is optimized to allow the hydrophilicity of the coated layer to be maximized.

Such composition may improve the surface hydrophilicity of the coated layer so that the contaminant on the rear face of the door may be easily removed with a simple water wash.

In some examples, the coated layer may include $P_2O_5$, $Al_2O_3$, $B_2O_3$, ZnO, I group-based metal oxide, or II group-based metal oxide such that the composition ratio of $P_2O_5$, $Al_2O_3$, $B_2O_3$, ZnO, I group-based metal oxide, and II group-based metal oxide is optimized to allow the coated layer to have improved visible light transmittance.

In some cases, a decrease in visible light transmittance of glass itself, which may be caused by the formation of the coated layer, may be minimized, so that the decrease in visibility due to the coated layer from the outside may be minimized.

In some examples, the coated layer may include $P_2O_5$, $Al_2O_3$, $B_2O_3$, ZnO, I group-based metal oxide, or II group-based metal oxide such that the composition ratio of $P_2O_5$, $Al_2O_3$, $B_2O_3$, ZnO, I group-based metal oxide, and II group-based metal oxide is optimized to allow the coated layer to reduce the firing temperature of the coating composition.

Thus, at the glass reinforcement process temperature, the firing of the coating composition may proceed at the same time. Thus, a separate coating composition firing process may be omitted, which may improve process efficiency. This may improve reliability of the reinforced glass by preventing the chemical bonding of the reinforced glass from breaking during the firing of the coated layer.

Hereinafter, the present disclosure is illustrated in more detail referring to a method for producing a coating composition according to present examples and comparative examples. The present examples may be merely an example to illustrate the present disclosure in more detail. Therefore, the present disclosure is not limited to the present examples.

Coated Layer Formation

As shown in Table 1 below, coating composition materials according to the present examples and comparative examples are provided:

TABLE 1

| Example | $P_2O_5$ wt % | $Al_2O_3$ wt % | $Na_2O +$ $K_2O$ wt % | $B_2O_3$ wt % | ZnO wt % | $BaO +$ $CaO + MgO$ wt % |
|---|---|---|---|---|---|---|
| Present example 1 | 45 | 5 | 40 | 4 | 3 | 3 |
| Present example 2 | 45 | 20 | 20 | 6 | 5 | 4 |
| Present example 3 | 55 | 5 | 20 | 8 | 6 | 6 |
| Comparative example 1 | 55 | 20 | 5 | 6 | 6 | 8 |
| Comparative example 2 | 45 | 40 | — | 5 | 6 | 4 |
| Comparative example 3 | 30 | 40 | 20 | 3 | 3 | 4 |
| Comparative example 4 | 30 | 20 | 45 | 2 | 2 | 1 |
| Comparative example 5 | 60 | 20 | — | 6 | 8 | 6 |
| Comparative example 6 | 60 | — | 20 | 6 | 6 | 8 |

In some examples, $Na_2CO_3$ and $K_2CO_3$ may be used as raw materials of $Na_2O$ and $K_2O$. $BaCO_3$, $CaCO_3$ and $MgCO_3$ may be used as raw materials of BaO, CaO and MgO. The remaining components may be prepared in the same manner as those shown in Table 1.

For example, the coating composition materials may be mixed and then the mixture is mixed with water at a ratio of 1:1. To the mixed solution, clay, aluminum oxide, borax, and bentonite may be added and mixed for 10 hours.

Subsequently, the mixed solution including the coating composition may be applied on a face of a glass substrate having a size of 200 mm×200 mm and a thickness of 1 mm or less by a screen printing process, and then the coating composition solution may be dried.

In some examples, the glass substrate may include soda lime glass, and in this case, a visible light transmittance thereof may be about 80% or greater.

In some examples, the piece of glass having the dried coating composition may be fired at a temperature of about 700 degrees C. for 5 minutes on the glass substrate, and then quenched to a room temperature. For example, the room temperature may be between 15 and 25 degrees C.

In this way, a reinforced glass substrate having a coated layer including a coating composition on one face of the glass substrate may be produced.

Next, provided are the vitrification properties of the coated layers, the damage properties of the coated layers, the firing properties thereof, the light transmittance and the cleaning performance of the coated layers, according to the present examples and comparative examples.

Vitrification and Damage Characteristics of Coated Layers

The vitrification of the coated layers was measured based on the formation of the crystalline form of the coated layer formed from the coating composition.

The damage of the coated layer was measured based on the cracking of the coated layer formed on the base glass.

TABLE 2

| Example | Vitrification presence or absence | Coated layer damage presence or absence |
|---|---|---|
| Present example 1 | ○ | x |
| Present example 2 | ○ | x |
| Present example 3 | ○ | x |
| Comparative example 1 | ○ | ○ |
| Comparative example 2 | x | x |
| Comparative example 3 | x | x |
| Comparative example 4 | x | x |
| Comparative example 5 | x | x |
| Comparative example 6 | x | x |

Referring to Table 2, it may be seen that the coated layers of the present examples 1 to 3 are all formed in an amorphous state. Vitrification is present. Further, when the coated layers of the present examples 1 to 3 are formed on the base, the coated layers do not crack.

However, the coated layers of the comparative example 2 to comparative example 6 have the crystalline form due to the increase of $Al_2O_3$ and the like. Vitrification is absent.

Further, as for the coated layer of the comparative example 1, when the coated layer is formed on the base, cracks may be generated in the coated layer and the coated layer may be damaged due to the difference in thermal expansion coefficient between the base glass and the coating composition thereof.

Measurement of Firing Temperature of Coated Layer

For the detection of absence or presence of firing of the coated layer, presence or absence of firing was detected at the temperature of about 700° C., which is the reinforcing temperature of the base glass.

When the base glass is applied to a cooking appliance or the like, a reinforcing process is performed to increase the strength of the glass for the safety of the user.

The firing process of the coated layer may proceed simultaneously with the reinforcing process of the base glass.

Figure 4:
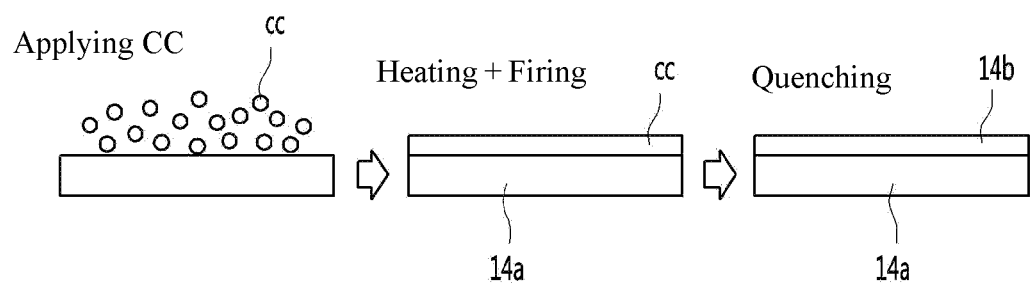
FIG. 4 is a diagram for illustrating an example firing process for a coated layer and an example glass reinforcing process.

For example, referring to FIG. 4, the coating compositions CC according to the present examples and comparative examples may be applied and dried on one face of a glass 14*a*, which is a base, by a screen printing process. Then, the glass was heated at a temperature 700 degrees C. Then, the temperature may be quenched to a room temperature to complete the glass reinforcing process.

In some examples, whether the coated layer is fired may be measured at the reinforcing temperature of the glass.

TABLE 3

| Example | Whether coated layer is fired at 700° C. |
| --- | --- |
| Present example 1 | OK |
| Present example 2 | OK |
| Present example 3 | OK |
| Comparative example 1 | NO |
| Comparative example 2 | NO |
| Comparative example 3 | NO |
| Comparative example 4 | NO |
| Comparative example 5 | NO |
| Comparative example 6 | NO |

As shown in Table 3, it may be seen that the coated layers according to the present example 1 to present example 7 have been fired at a glass reinforcing temperature of about 700° C.

Accordingly, as for the coated layers according to the present example 1 to the present example 7, the firing of the coated layer may occur at the same time as the glass reinforcing process. Thus, a separate coated layer firing process may be omitted, which may improve process efficiency.

In this connection, the conventional approach has a following defect: when a coated layer is formed after the reinforcing process, the chemical bond of the reinforced glass may be broken by the firing temperature of the coated layer.

However, as for the coated layers according to the present example 1 to the present example 7, the firing of the coated layer may occur at the same time as the glass reinforcing process. Thus, the defect may be remedied.

On the other hand, the coated layers according to the comparative examples 1 to 6 have been not fired at a glass reinforcing heating temperature of about 700° C. That is, the firing temperature of the coating composition of the coated layers according to the comparative example 1 to comparative example 6 may be known to exceed 700° C.

Accordingly, as for the coated layers according to the comparative examples 1 to 6, the firing of the coated layer may not occur at the same time as the glass reinforcing process. Thus, a separate coated layer firing process may be required, thereby to reduce process efficiency.

Further, as for the coated layers according to the comparative examples 1 to 6, since the coated layers are additionally formed after the reinforcing process, the chemical bond of the reinforced glass may be broken due to the firing temperature of the coated layer, so that the strength of the glass may be lowered.

Measurement of Light Transmittance of Coated Layer

For the light transmittance of the coated layer, the optical transmittance in a visible-light region having a wavelength range of about 380 nm to about 780 nm was measured using a UV visible meter.

The visible-light transmittance of the base glass before the coating was about 80%. The visible-light transmittance of the glass having the coated layer formed thereon was measured using the meter.

Figure 5:
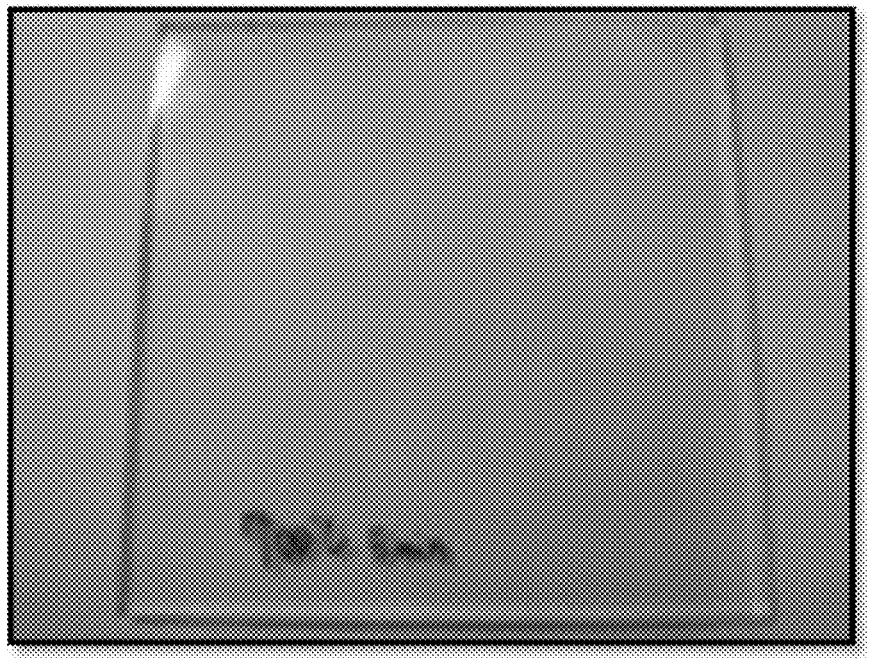
FIGS. 5 to 8 illustrate examples of a light transmittance of glass having a coated layer on the glass.
Figure 6:
Figure 7:
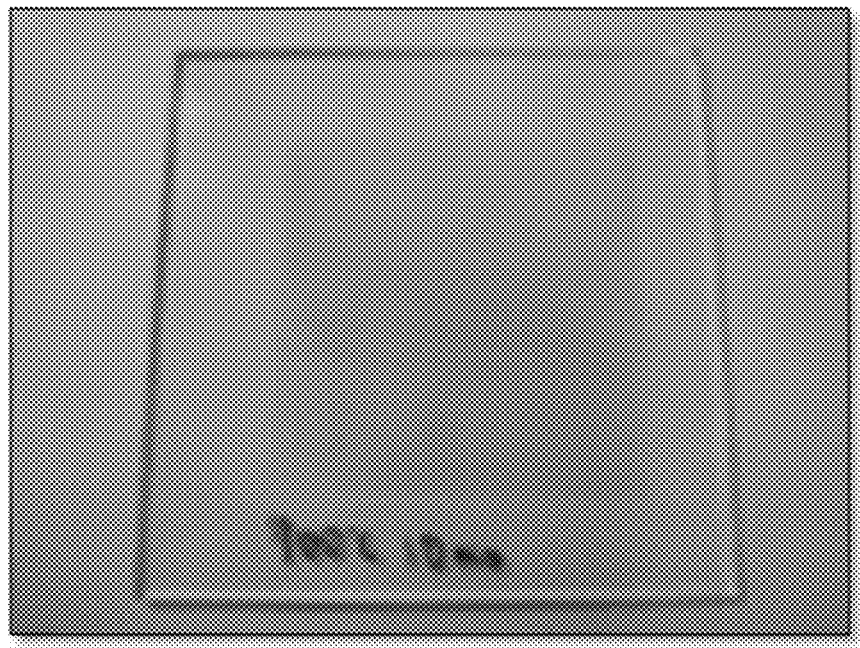
Figure 8:
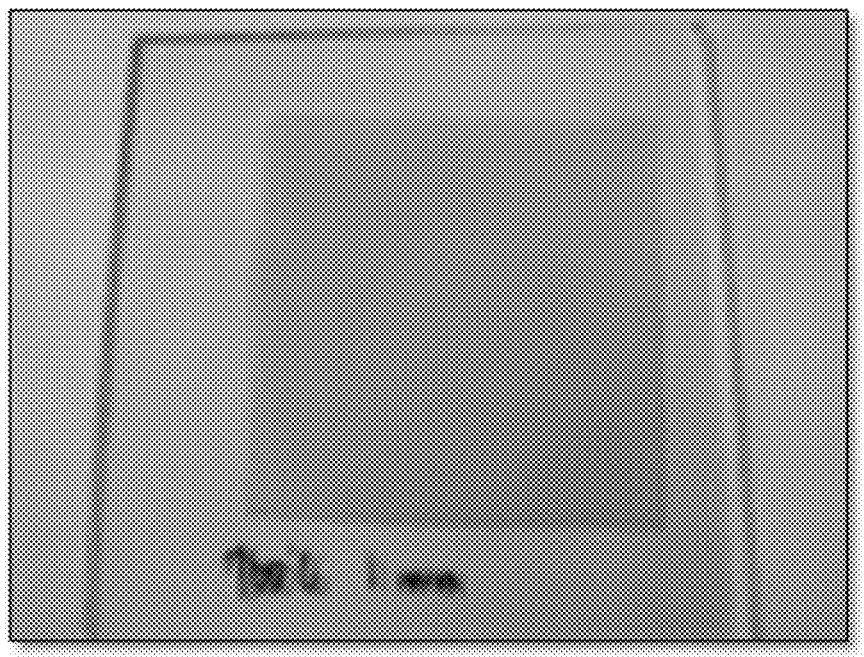

FIGS. 5 to 8 show the reinforced glasses with the coated layers formed thereon based on the visible-light transmittances. FIG. 5 shows the reinforced glass with visible-light transmittance greater than or equal to 60%; FIG. 6 shows the reinforced glass with a visible-light transmittance below 60%; FIG. 7 shows the reinforced glass with a visible-light transmittance below 40%; and FIG. 8 shows the reinforced glass with a visible-light transmittance below 20%.

Referring to FIGS. 5 to 8, when the visible-light transmittance is 60% or higher, an object may be easily visually recognized from the outside. When the visible-light transmittance is below 60%, the increase in opacity makes it difficult to visually identify the object from the outside.

TABLE 4

| Example | Visible-light transmittance % |
| --- | --- |
| Present example 1 | 70 |
| Present example 2 | 60 |
| Present example 3 | 60 |
| Comparative example 1 | (non-measurable due to coated layer crack) |
| Comparative example 2 | 20 |
| Comparative example 3 | 30 |
| Comparative example 4 | 20 |
| Comparative example 5 | 25 |
| Comparative example 6 | 35 |

Referring to Table 4, it may be seen that the reinforced glass with the coated layers of the present example 1 to present example 3 has a visible-light transmittance of 60% or higher. That is, it may be appreciated that when a reinforced glass having the present coated layer formed thereon is applied to a cooking appliance or the like, an object may be easily visually identifiable from the outside with the naked eye.

On the other hand, the reinforced glass with the coated layer of the comparative example 1 to comparative example 6 has a visible-light transmittance below 60%. That is, it may be known that when the reinforced glass having the comparative coated layers formed thereon is applied to a cooking appliance or the like, the object may not be easily distinguished from the outside by the naked eye.

Measurement of Cleaning Performance of Coated Layer

A cleaning performance of the coated layer may be measured by the following method.

For instance, after the surface of the coated layer is washed with distilled water or alcohol, a jig for applying a contaminant thereon is formed on the coated layer. The contaminant was applied thinly on a 10 mm×30 mm area of the coated layer using a brush, and then the contaminant was cured.

In some examples, the contaminant may include monster mash or chicken oil.

The monster mash may be produced using the recipe as shown in FIG. 9. Alternatively, the chicken oil was produced by collecting chicken oil that is generated when raw chicken was cooked.

Thereafter, the cured contaminant was wiped with a wet scrubber under a force of 3 kgf or less. In some examples, the number of wiping reciprocating travels is defined as shown in Table 5. The evaluation results are shown in Table 6 below.

TABLE 5

| number of wiping reciprocating travels | Performance Level |
| --- | --- |
| 5 or smaller | 5 |
| 10 or smaller | 4 |
| 15 or smaller | 3 |
| 25 or smaller | 2 |
| 25 or larger | 1 |

TABLE 6

| Example | Cleaning performance |
| --- | --- |
| Present example 1 | 4 |
| Present example 2 | 5 |
| Present example 3 | 4 |
| Comparative example 1 | Non-measurable due to coated layer crack |
| Comparative example 2 | 1 |
| Comparative example 3 | 1 |
| Comparative example 4 | 1 |
| Comparative example 5 | 2 |
| Comparative example 6 | 1 |

Table 5 and Table 6 indicate that the reinforced glass with the coated layer according to the present example 1 to present example 3 has improved cleaning performance.

That is, the coated layer according to the present example 1 to present example 3 has maximized hydrophilicity of the coated layer via achievement of the optimal range of composition ratio of the coating composition. This may allow the contaminant attached to the surface of the coated layer to be easily be removed by simply rinsing the same with water.

That is, as shown in FIG. 10, the coated layer may improve hydrophilicity, and thus water W may effectively penetrate the interface between the coated layer C and the contaminant P on the coated layer C during water washing. Thus, contaminants may be easily removed from the coated layer.

In some examples, it may be seen that the coated layers according to the comparative examples 1 to 6 have low hydrophilicity of the coated layer. In this case, it may be difficult to easily remove the contaminant from the coated layer only by washing the same with water.

In some examples, the coating compositions may be applied to the reinforced glass. For instance, the coating composition may be applied to reinforced glass used for a door of a cooker or the like.

In some implementations, the coating composition may be applied to glass that can be used as the base of the door. Then, the coating composition may be subjected to a firing and drying process to form the coated layer.

In some examples, the coated layer includes $P_2O_5$, $Al_2O_3$, $B_2O_3$, ZnO, I group-based metal oxide, or II group-based metal oxide such that the composition ratio of $P_2O_5$, $Al_2O_3$, $B_2O_3$, ZnO, I group-based metal oxide, and II group-based metal oxide is optimized to allow the hydrophilicity of the coated layer to be maximized.

This improves the surface hydrophilicity of the coated layer so that the contaminant on the rear face of the door may be easily removed with a simple water wash.

In some implementations, the coated layer includes $P_2O_5$, $Al_2O_3$, $B_2O_3$, ZnO, I group-based metal oxide, II group-based metal oxide such that the composition ratio of $P_2O_5$, $Al_2O_3$, $B_2O_3$, ZnO, I group-based metal oxide, and II group-based metal oxide is optimized to allow the coated layer to have improved visible light transmittance.

Thus, the decrease in visible light transmittance of the glass itself, which may be caused by the formation of the coated layer, may be minimized, so that the decrease in visibility due to the coated layer from the outside may be minimized.

In some implementations, the coated layer includes $P_2O_5$, $Al_2O_3$, $B_2O_3$, ZnO, I group-based metal oxide, or II group-based metal oxide such that the composition ratio of $P_2O_5$, $Al_2O_3$, $B_2O_3$, ZnO, I group-based metal oxide, and II group-based metal oxide is optimized to allow the coated layer to reduce the firing temperature of the coating composition.

Thus, at the glass reinforcement process temperature, the firing of the coating composition may proceed at the same time. Thus, a separate coating composition firing process may be omitted, which may improve process efficiency. This may improve the reliability of the reinforced glass by preventing the chemical bonding of the reinforced glass from breaking during the firing of the coated layer.

In the above description, numerous specific details are set forth in order to provide a thorough understanding of the present disclosure. The present disclosure may be practiced without some or all of these specific details. Examples of various implementations have been illustrated and described above. It will be understood that the description herein is not intended to limit the claims to the specific implementations described. On the contrary, it is intended to cover alternatives, modifications, and equivalents as may be included within the spirit and scope of the present disclosure as defined by the appended claims.

What is claimed is:

1. A cooking device comprising:
   a cooking chamber defined by a cavity of the cooking device;
   a door configured to open and close at least a portion of the cooking chamber; and
   at least one heating source configured to provide heat to an object in the cooking chamber,
   wherein the door includes a base comprising glass and a coating layer disposed on the base, the coating layer comprising a coating composition configured to be applied to the glass,
   wherein the coating composition includes phosphorus pentoxide ($P_2O_5$), aluminum oxide ($Al_2O_3$), boron trioxide ($B_2O_3$), zinc oxide (ZnO), I group-based metal oxide, and II group-based metal oxide,
   wherein the coating composition comprises by weight based on a total weight of the coating composition:
   35 to 55% $P_2O_5$,
   5 to 20% $Al_2O_3$,
   40% I group-based metal oxide,
   5 to 10% $B_2O_3$,
   2 to 4% ZnO, and
   1 to 10% II group-based metal oxide,
   wherein a sum of a weight % of the aluminum oxide ($Al_2O_3$) and a weight % of the I group-based metal oxide is less than or equal to a weight % of the phosphorus pentoxide ($P_2O_5$), wherein a firing temperature of the coating layer is less than or equal to 700° C., wherein the coating layer is in an amorphous state, and wherein a visible-light transmittance of the glass of the base coated by the coating composition is greater than or equal to 60% and less than or equal to 80%.

2. The cooking device of claim 1, wherein the I group-based metal oxide includes at least one metal oxide selected from sodium oxide ($Na_2O$) or potassium oxide ($K_2O$), and wherein the II group-based metal oxide includes at least one metal oxide selected from barium oxide (BaO), calcium oxide (CaO), or magnesium oxide (MgO).

3. The cooking device of claim 1, wherein the base includes soda lime glass.

4. The cooking device of claim 1, comprising 15 to 20% $Al_2O_3$ by weight.

5. The cooking device of claim 1, wherein the firing temperature of the coating layer is equal to a glass reinforcing temperature of the glass to thereby increase a strength of the glass while the coating layer is processed at the firing temperature.

6. The cooking device of claim 5, wherein the coating layer is defined by a firing process that is performed simultaneously with a glass reinforcing process of the glass at the firing temperature.

7. The cooking device of claim 5, wherein the coating layer is defined, without a separate firing process for the coating layer, by a glass reinforcing process of the glass that is performed at the firing temperature.

* * * * *